US006663104B2

(12) United States Patent
DaCunha et al.

(10) Patent No.: US 6,663,104 B2

(45) Date of Patent: Dec. 16, 2003

(54) METHOD AND SYSTEM FOR ALIGNING MOVING SHEETS

(75) Inventors: Steven J. DaCunha, West Hartford, CT (US); Boris Rozenfeld, New Milford, CT (US)

(73) Assignee: Pitney Bowes Inc., Stamford, CT (US)

(*) Notice: Subject to any disclaimer, the term of this patent is extended or adjusted under 35 U.S.C. 154(b) by 174 days.

(21) Appl. No.: 09/981,829

(22) Filed: Oct. 18, 2001

(65) Prior Publication Data

US 2003/0075859 A1 Apr. 24, 2003

(51) Int. Cl.[7] .............................................. B65G 57/03

(52) U.S. Cl. .................... 271/241; 271/221; 414/789.1; 414/907

(58) Field of Search ................................ 271/221, 241, 271/220, 240; 414/789.1, 907; 198/456

(56) References Cited

U.S. PATENT DOCUMENTS

| | | | | | |
|---|---|---|---|---|---|
| 1,963,791 | A | * | 6/1934 | Keller | 198/456 |
| 2,484,845 | A | * | 10/1949 | Nordquist et al. | 271/240 |
| 2,488,551 | A | * | 11/1949 | Nordquist et al. | 271/240 |
| 2,528,106 | A | * | 10/1950 | Albrecht | 271/240 |
| 2,893,731 | A | * | 7/1959 | Nordquist et al. | 271/240 |
| 3,910,568 | A | * | 10/1975 | Brown et al. | 271/221 |
| 4,046,369 | A | * | 9/1977 | Kluge et al. | 271/3.05 |
| 4,381,108 | A | * | 4/1983 | Newsome | 271/198 |
| 4,710,088 | A | * | 12/1987 | Kramer | 211/49.1 |
| 4,767,116 | A | * | 8/1988 | Eberle | 271/238 |
| 4,898,373 | A | * | 2/1990 | Newsome | 270/52.29 |
| 4,919,414 | A | * | 4/1990 | Marschke et al. | 271/227 |
| 5,203,246 | A | * | 4/1993 | Smitterberg et al. | 83/420 |
| 5,516,093 | A | * | 5/1996 | Ballard et al. | 271/240 |
| 5,660,030 | A | * | 8/1997 | Auerbach et al. | 53/569 |
| 6,120,239 | A | * | 9/2000 | Roskam | 414/791.2 |
| 6,409,462 | B2 | * | 6/2002 | Newsome et al. | 414/788.9 |
| 6,454,257 | B1 | * | 9/2002 | Cisar | 271/254 |

FOREIGN PATENT DOCUMENTS

| | | | | |
|---|---|---|---|---|
| JP | 63208438 | * | 8/1988 | 271/240 |
| SU | 1382792 | * | 3/1988 | 271/240 |

* cited by examiner

*Primary Examiner*—Donald P. Walsh
*Assistant Examiner*—Daniel Schlak
(74) *Attorney, Agent, or Firm*—Angelo N. Chaclas; Charles R. Malandra, Jr.; Michael J. Cummings

(57) ABSTRACT

A method and system for aligning a moving stack of sheets. A pair of cams, positioned on opposite sides of the moving stack, rotate synchronously to each other but in opposite directions. When the stack approaches the cams, the distance between the outer surfaces of the cams is wider to the stack width to receive the stack. As the stack moves forward further, the distance between the cam surfaces is reduced so as to allow the cam surfaces push the sheets toward a center line until the distance between the cam surfaces is substantially equal to the width of the sheets. In a sheet collator where sheets are moved by a plurality of finger pairs which are linked to a moving chain, the cam can also be linked to the moving chain so that their rotation is synchronous to motion of the stacks.

19 Claims, 12 Drawing Sheets

METHOD AND SYSTEM FOR ALIGNING MOVING SHEETS

TECHNICAL FIELD

The present invention relates to an envelope inserting machine and, more particularly, to a method and device for aligning enclosure materials, which are released from enclosure feeders and collated into a stack to be inserted into an envelope for mailing.

BACKGROUND OF THE INVENTION

In an inserting machine for mass mailing, there is a gathering section where enclosure material is gathered before it is inserted into an envelope at an envelope insertion area. The gathering section is sometimes referred to as a chassis subsystem, which includes a gathering transport with pusher fingers rigidly attached to a conveyor belt and a plurality of enclosure feeders mounted above the transport. If the enclosure material contains many documents, these documents must be separately fed from different enclosure feeders.

Inserting machines are well-known. For example, U.S. Pat. No. 4,501,417 (Foster et al.) discloses an inserter feeder assembly for feeding enclosures; U.S. Pat. No. 4,753,429 (Irvine et al.) discloses a collating station; and U.S. Pat. No, 5,660,030 (Auerbach et al.) discloses an envelope inserter station wherein envelopes are separately provided to an envelope supporting deck where envelopes are spread open so as to allow enclosure materials to be stuffed into the envelopes.

An exemplary inserting machine is shown in FIG. 1. As shown, an inserting machine 10 typically includes a gathering section 12 an envelope feeder/inserter station 14. The gathering section 12 includes a plurality of enclosure feeders 20 for separately releasing documents 100. The released documents are pushed toward the envelope feeder/inserter station 14 by a plurality of pusher fingers 30, which are attached to an endless chain 32 for movement. As shown, the document 100 released by a respective enclosure feeder 20 lands on a tray 24 and then pushed off the tray 24 by an approaching pusher finger 30 onto a deck 40. As the pusher fingers 30 move forward, they collect more released documents 100. When the released documents 100, pushed by the pusher fingers 30, reach the envelope feeder/inserter station 14, they are collated into a stack (collation) 110 comprising of a plural of sheets. Thus, the gathering section 12 can also be referred to as a sheet collator. The envelope feeder/inserter station 14 includes an envelope feeder 22 positioned above an envelope insertion area 16 for releasing one envelope 200 at a time so that the stack 110 can be inserted in the released envelope 200 (see FIG. 2). Usually, the enclosure feeders 20 are arranged and aligned such that the released documents 100 are supposed to line up with each other when are collated into a stack 110. However, when a document 100 is released onto the tray 24, as shown in FIG. 2, it may not land at a designated position. It may be skewed to one side or another. Thus, even though the trailing edge of the document, where the document is pushed by the pusher finger, can be automatically aligned with the trailing edge of other documents in the stack, the side edges of the document may not be aligned with the side edges of the other documents in the stack. This may cause a problem when the stack is inserted into the envelope.

Thus, it is advantageous and desirable to provide a method and system for aligning the documents in a stack prior to the insertion of the documents into an envelope.

SUMMARY OF THE INVENTION

It is a primary object of the present invention to align the side edges of a plurality of sheets in a moving stack or collation. The object can be achieved by providing a pair of alignment devices positioned at opposite side of the moving stack to push the side edges of the sheets toward a center line of the deck of a gathering section in an inserting machine.

Accordingly, the first aspect of the present invention is an alignment system for aligning a stack having a stack width and containing a plurality of sheets, each sheet having a leading edge and two opposing side edges defining a sheet width smaller than the stack width, wherein the stack is moved along a path in a moving direction toward a downstream end. The alignment system comprising: a pair of alignment devices located at opposite sides of a center line of the path near the downstream end for pushing the opposing side edges of the sheets toward the center line, wherein each alignment device comprises a cam having an outer surface with at least one section thereof having a non-constant radius, and wherein the outer surfaces face each other to define a gate having a gate width, and a mechanism to cause the cams to rotate synchronously with respect to each other in opposite directions to change the gate width such that the gate width is greater than the stack width when the leading edge of the sheets moves into the gate, and the gate width is reduced after the leading edge has passed the gate until the gate width is substantially equal to the sheet width so as to cause the side edges of the sheets in the stack to be aligned with each other.

Preferably, each of the cams is mounted on a shaft, and the alignment system further comprises a mechanism to relocate the shafts relative to each other to adjust the gate width according to the sheet width.

Preferably, the outer surface of the cams is spiral in shape. It is also possible that the outer surface of the cams is circular in shape and each cam is rotated about an off-centered axis. It is also possible that each of the cams comprises a first circular disk rotatably mounted on a second circular disk and the cam is caused to rotate about the center of the second circular disk, wherein the outer surface of the cams is the circumference of the first circular disk. Alternatively, each cam is caused to rotate about a rotational axis and the outer surface of each cam comprises two spiral surface sections symmetrically arranged about the rotational axis.

Preferably, the sheets are moved at a constant sheet velocity by a moving means, and the cams are operatively linked to the moving means for rotation in synchronism with the movement of the sheets. It is also preferred that the cams are rotated at a constant angular velocity defining a tangential velocity at a point on the outer surface and the tangential velocity is substantially equal to the sheet velocity when the gate width is substantially equal to the sheet width.

According to the second aspect of the present invention, a method of aligning sheets in a moving stack having a stack width, wherein each of the sheets has a leading edge and two opposing side edges defining a sheet width smaller than the stack width, and the stack is moved along a path in a moving direction toward a downstream end, the method comprising the steps of:

- providing a pair of alignment devices located at opposite sides of a center line of the path near the downstream end for pushing the opposing side edges of the sheets toward the center line, wherein each of the alignment device comprises a cam having an outer surface with at least one section thereof having a non-constant radius, and wherein the outer surfaces face each other to define a gate having a gate width;

causing the cams to rotate synchronously with respect to each other in opposite directions to change the gate width such that the gate width is greater than the stack width when the leading edge of the sheets moves into the gate, and the gate width is reduced after the leading edge has passed the gate until the gate width is substantially equal to the sheet width so as to cause the side edges of the sheets in the stack to be aligned with each other.

Preferably, the sheets are moved at a constant sheet velocity by a moving means and the cams are operatively linked to the moving means for rotation in synchronism with the movement of the sheets, and wherein the cams are rotated in a constant angular velocity.

According to the third aspect of the present invention, a sheet collation apparatus having an upstream end and a downstream end, the sheet collation apparatus comprises:

a moving mechanism to move a plurality of sheets in a moving path from the upstream end toward the downstream end, wherein each sheet has a leading edge and two opposing side-edges defining a sheet width;

means, located along the moving path, for collating the sheets into a stack having a stack width greater the sheet width;

a pair of alignment devices located at opposite sides of a center line of the path near the downstream end for pushing the opposing side edges of the sheets in the stack toward the center line, wherein each alignment device comprises a cam having an outer surface with at least a section thereof having a non-constant radius, and wherein the outer surfaces face each other to define a gate having a gate width, and a mechanism to cause the cams to rotate synchronously with respect to each other in opposite directions to change the gate width such that the gate width is greater than the stack width of the sheets when the leading edge moves into the gate, and the gate width is reduced after the leading edge has passed the gate until the gate width is substantially equal to the sheet width so as to cause the side edges of the sheets defining the stack to be aligned with each other.

The present invention will become apparent upon reading the description taken in conjunction with FIGS. 3*a*–6.

DETAILED DESCRIPTION

Figure 1:
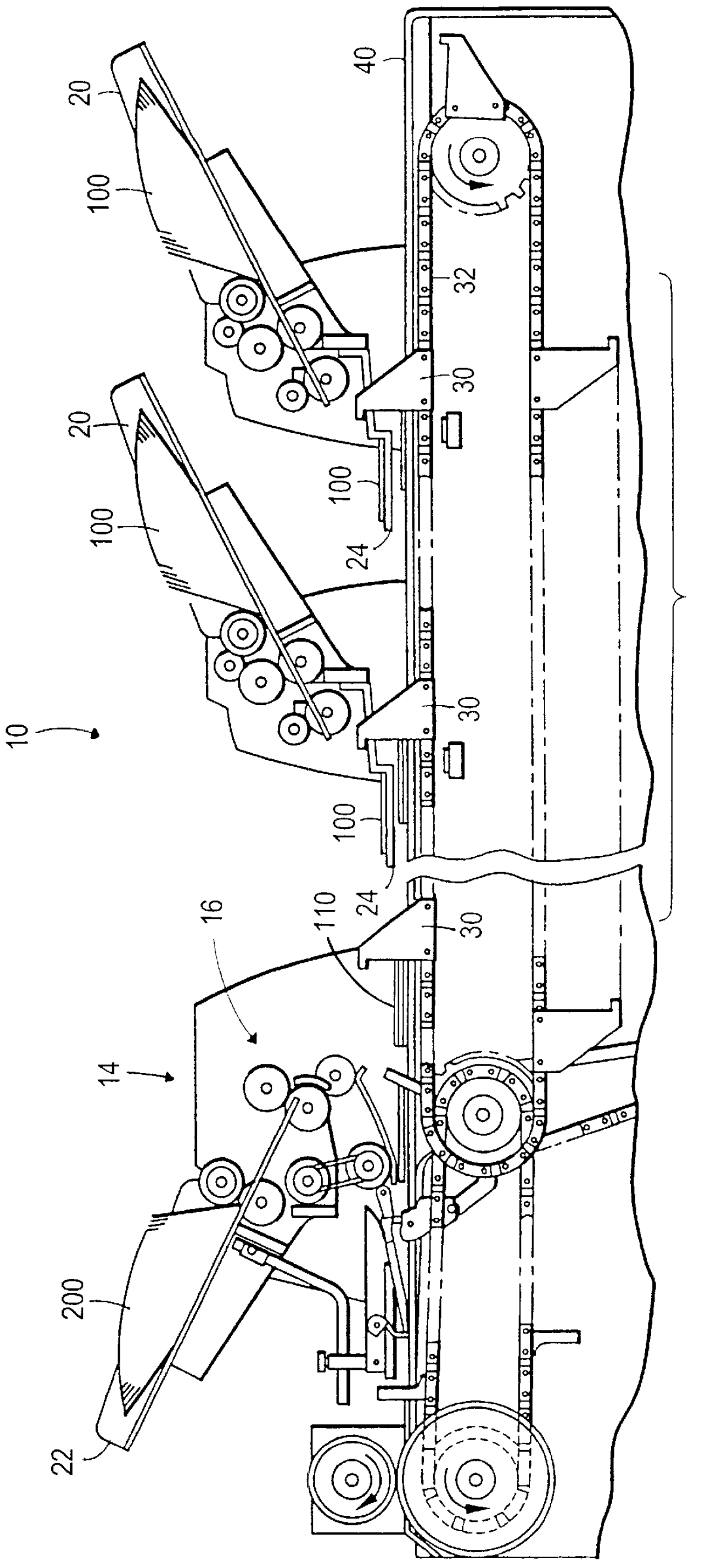
FIG.1 PRIOR ART
FIG. 1 is a diagrammatic representation illustrating a prior art inserting machine.
Figure 2:
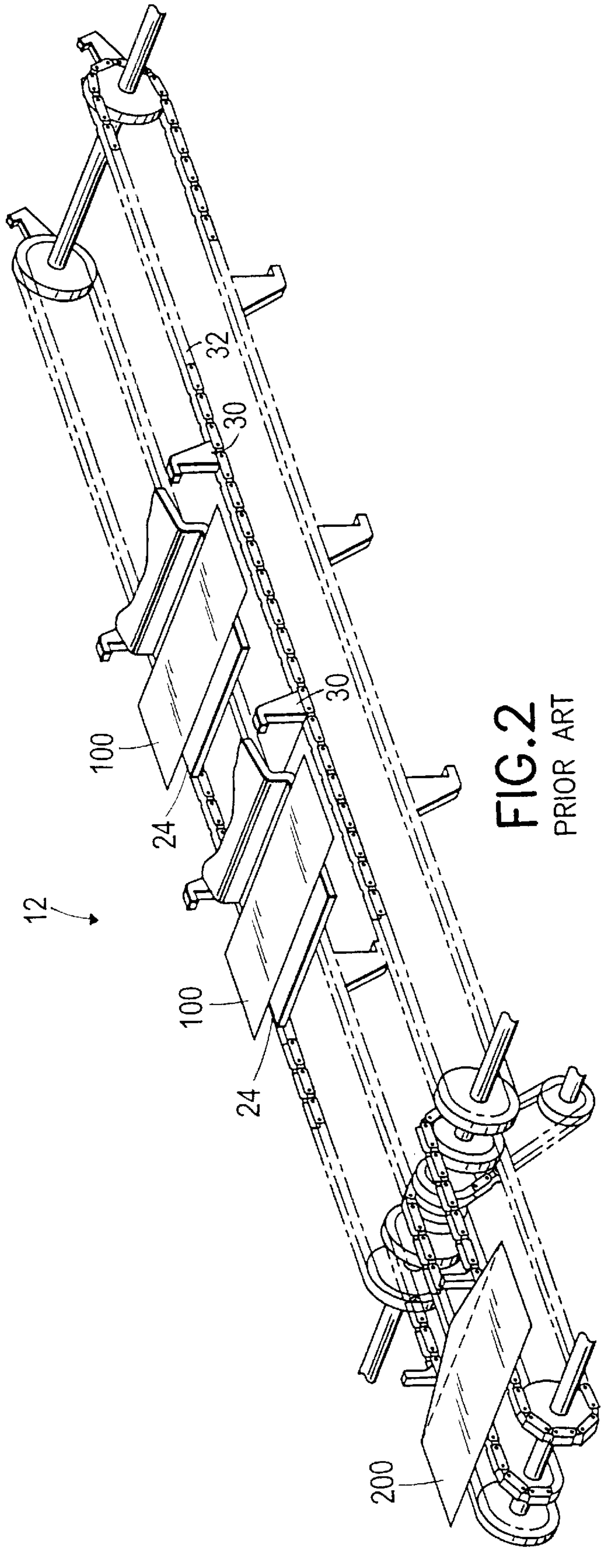
FIG.2 PRIOR ART
FIG. 2 is a diagrammatic representation illustrating part of the prior art inserting machine as shown in FIG. 1.
Figure 3:
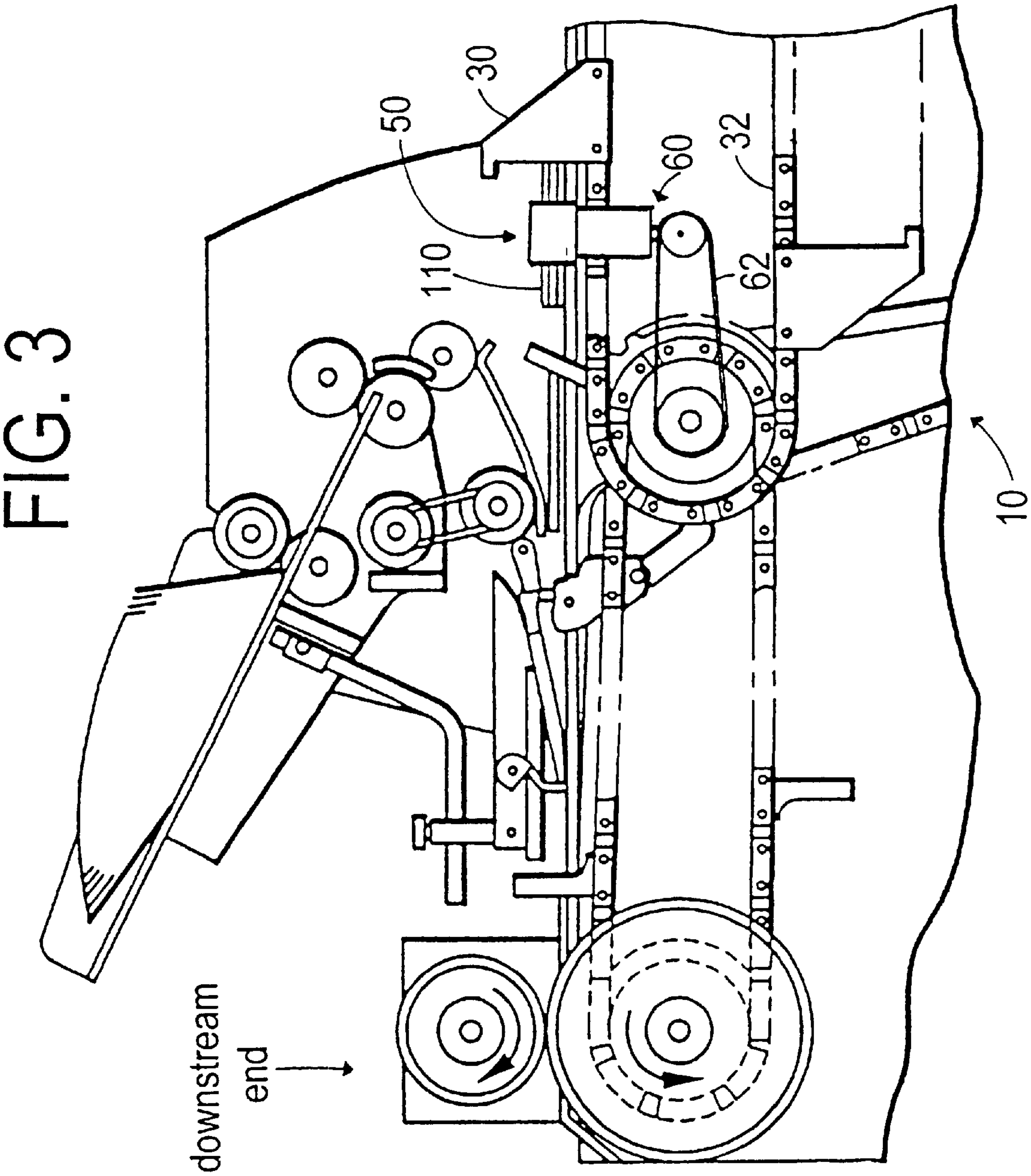
FIG. 3 is a diagrammatic representation illustrating the location of the alignment system, according to the present invention, in relation to envelope feeder/inserter station in an inserting machine.

FIG. 3 shows the location of the alignment system in relation to the sheet collation section 12 in an inserting machine 10. The alignment system, according to the present invention is denoted by reference numeral 50. As shown the alignment system 50 is located in the downstream end. Preferably, the alignment system 50 is linked to the endless chain 32 with coupling mechanism 60, 62 so that the alignment system 50 is caused to operate in synchronism with the pusher fingers 30.

Figure 4:
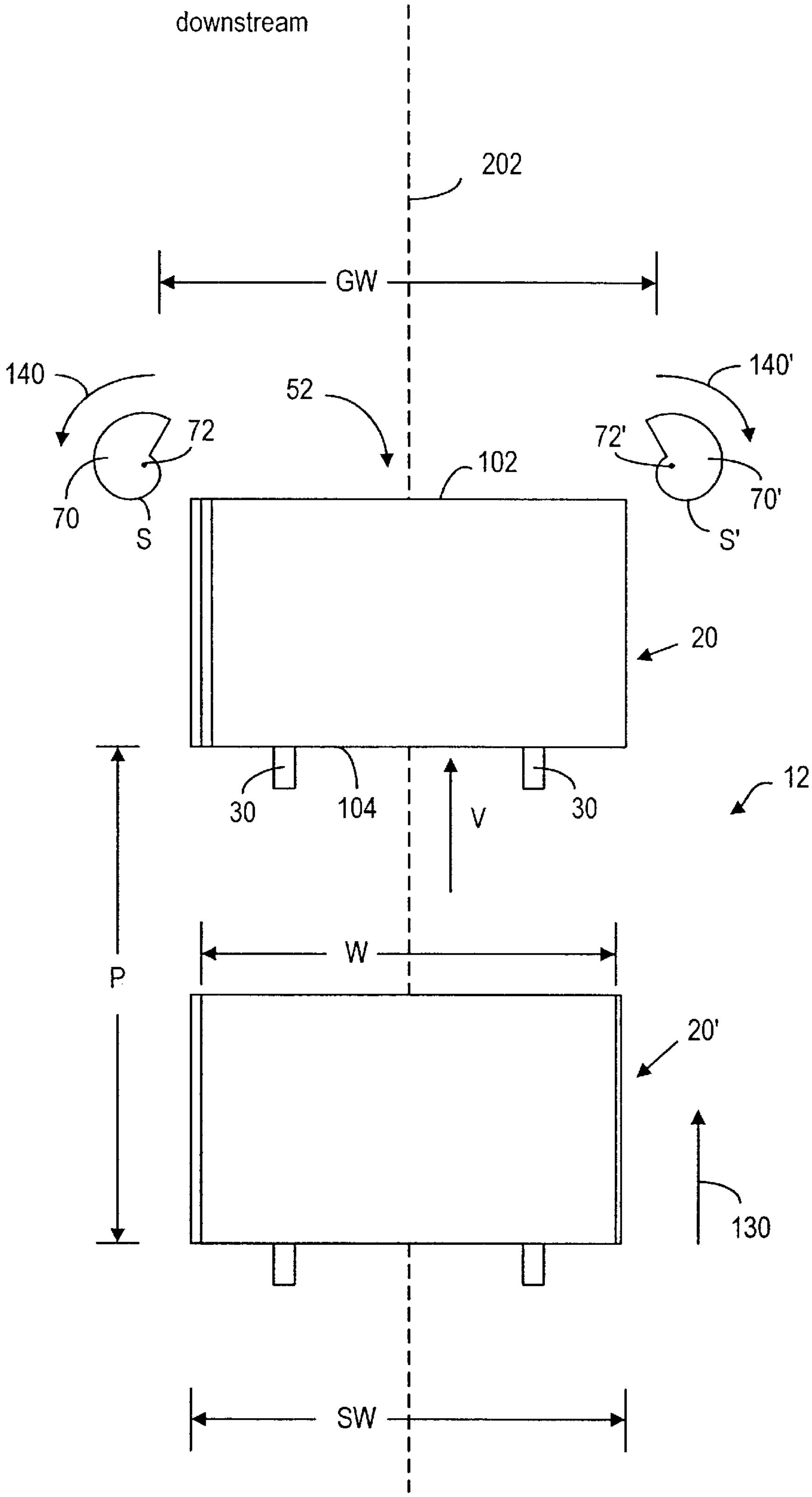
FIG. 4 is a diagrammatic representation illustrating the alignment system, according to the present invention.

FIG. 4 illustrates the arrangement of the alignment system 50 in relation to a moving path of the stacks 110 in the sheet collation section 12. The moving path is represented by a center line 202. As shown, each stack 110 is pushed by a pair of pusher fingers 30 toward the downstream end of the collation section 12 with a moving speed V along a moving direction represented by arrow 130. The separation between adjacent stacks 110 is referred to as a pitch, P. The leading edge and the trailing edge of each are denoted by reference numeral 102 and 104, respectively. The width of the stack 20 is denoted by SW, which is greater than the width W of the sheets. It should be noted that the width of one stack may be slightly different from the width of another stack. However, the stack width in a typical inserting machine, in general, does not various significantly. The alignment system 50 comprises a pair of cams, 70 and 70', separately mounted on shafts 72 and 72' for rotation. The cams 70 and 70' are positioned at opposite sides of the center line 202, which is parallel to the moving direction 130. As shown in FIG. 4, the cams 70 and 70' are caused to rotate synchronously with each other but in opposite directions 140, 140'. The outer surfaces S and S' of the cam 70 and 70' face each other to define a gate 52 having a gate width GW. Because the radius curvature of outer surfaces S and S' varies from one section to another, the gate width GW also varies from one time to another as the cams 70, 70' rotate. It is arranged such that when a stack 110 approaches the gate 52, the gate width GW is sufficiently greater than the stack width SW. When the stack is moving through the gate, the GW is reduced in order to align the sheets in the stack, as shown in FIGS. 5*a*–5*d*. However, it is preferred that the gate width GW is not smaller than W while the stack is moving through the gate 52. After the trailing edge 104 of a stack has passed the gate 52, the gate width GW can be smaller or greater than, or equal to W.

As shown in FIG. 3, it is preferable to link the alignment system 50 to the endless chain 30 for motion. As such, the rotating motion of the cams 70 and 70' can be synchronized with the moving speed V of the pusher fingers 30. With the cam design as shown in FIG. 4, the cams 70 and 70' are required to rotation by 360 degrees in a time period t=P/V, or the angular velocity of the cams 70 and 70' is equal to 2πV/P.

Figure 5A:
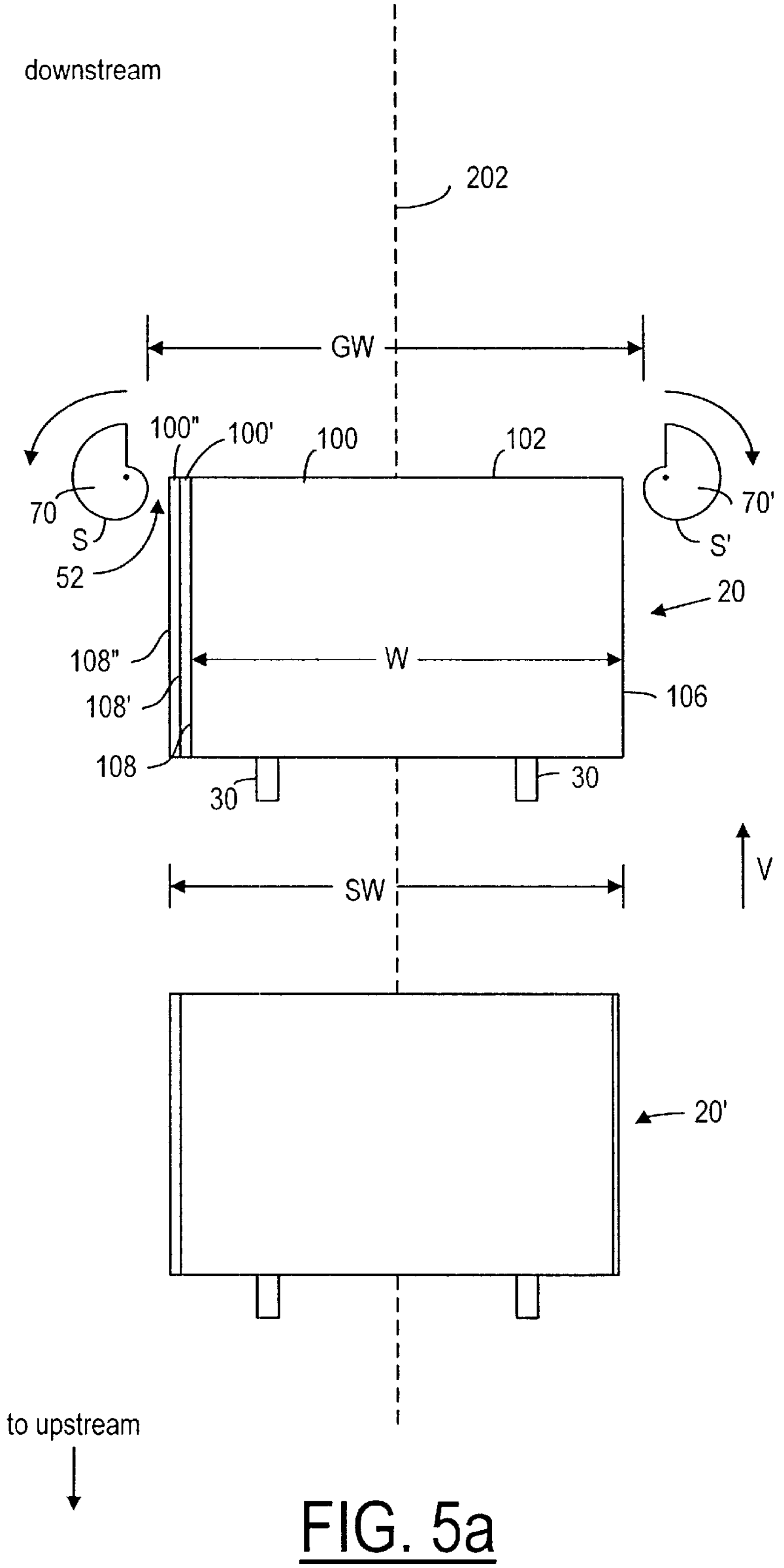
FIG. 5*a* is a diagrammatic representation illustrating the alignment system, when the leading edge of a stack of sheets is moved into the aligning position of the alignment system.

FIGS. 5*a*–5*e* illustrate the principle of sheet alignment method, according to the present invention. As shown in these figures, two stacks 20 and 20' each having three sheets 100, 100' and 100" are moved by two sets of pusher fingers 30 toward the downstream ends. The width of the stack 20 is slightly greater than that of the stack 20', but these widths are substantially equal a typical stack width CW. FIG. 5*a* shows when the leading edge 102 of the stack 20 just reaches the gate 52 defmed by the facing outer surfaces S and S' of the cams 70 and 70'. The left side edges of the sheets 100, 100' and 100" are denoted by reference numerals 108, 108' and 108" respectively. Only the right side edge 106 of the top sheet 100 can be seen in FIG. 5*a*. The width of the sheets 100, 100' and 100" is denoted by W. As shown, because the gate width GW at this point is sufficiently greater than the stack width SW, the outer surface S of the cam 70 does not touch any of the left side edges 108, 108' and 108", and the outer surface S' of the cam 70' does not touch the right edge 106.

Figure 5B:
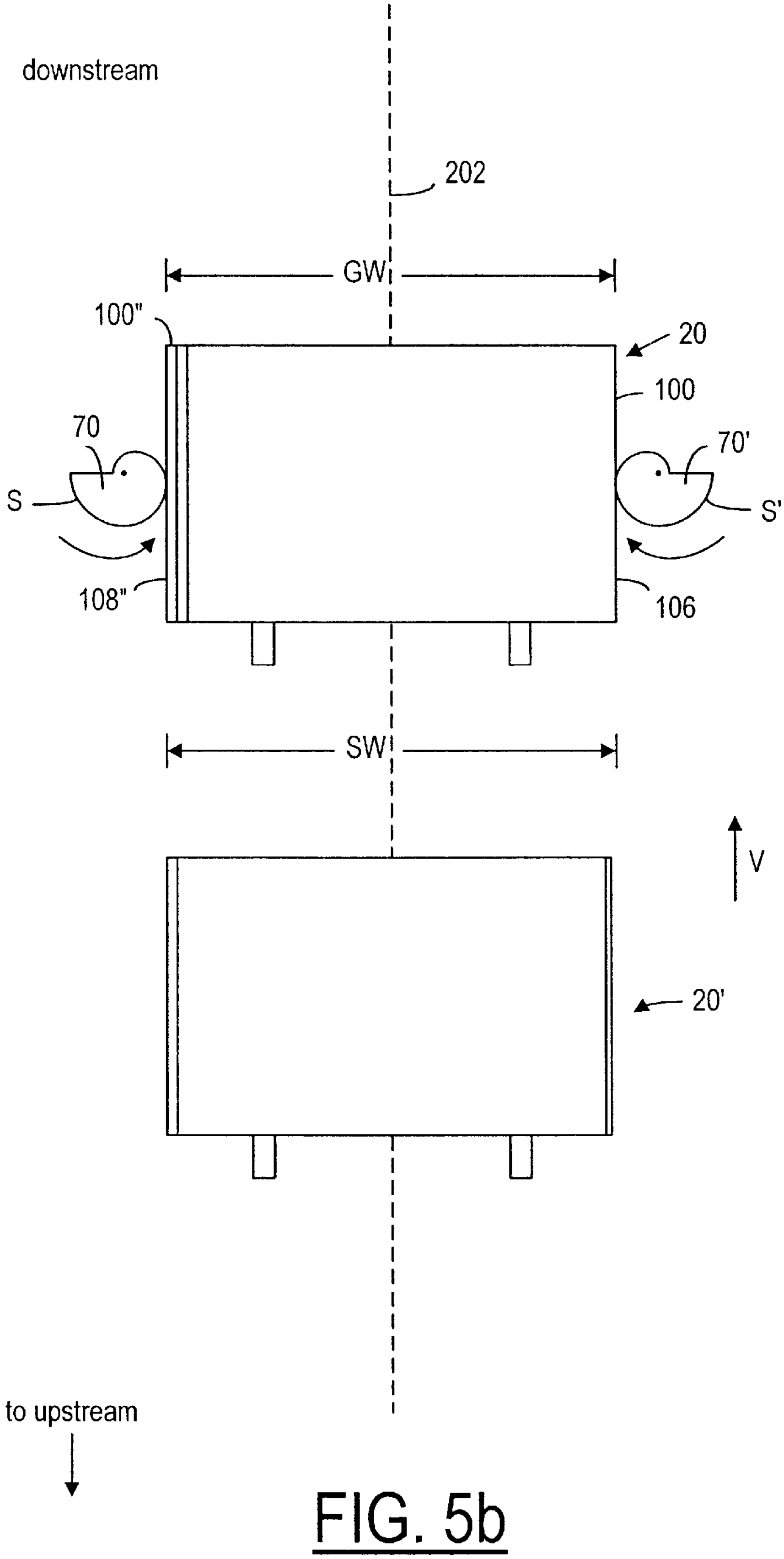
FIG. 5*b* is a diagrammatic representation illustrating the alignment system, according to the present invention, when the stack is about halfway through the aligning position of the alignment system.
Figure 5C:
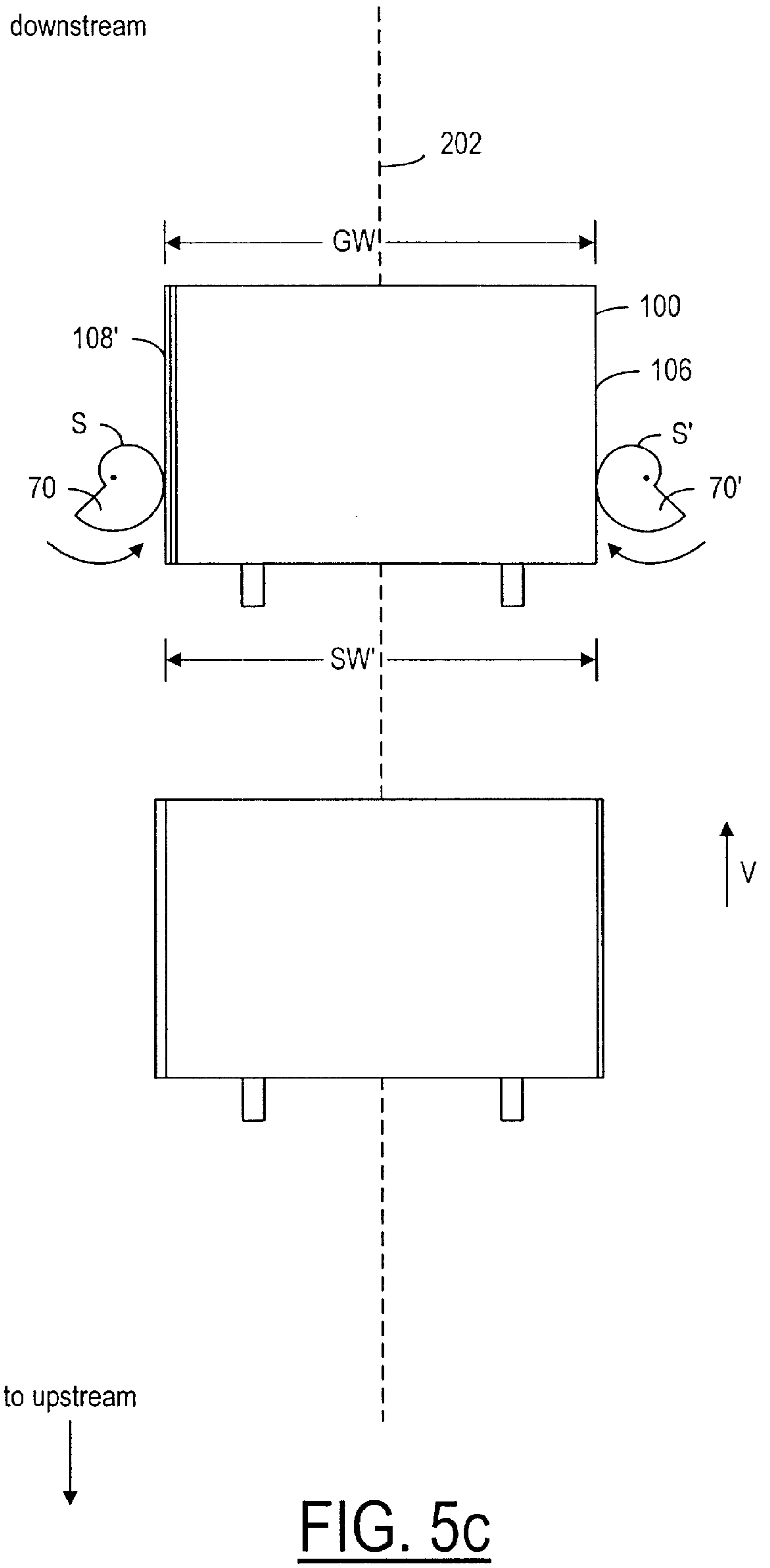
FIG. 5*c* is a diagrammatic representation illustrating the alignment system, according to the present invention, when the stack is almost moved through the aligning position of the alignment system.
Figure 5D:
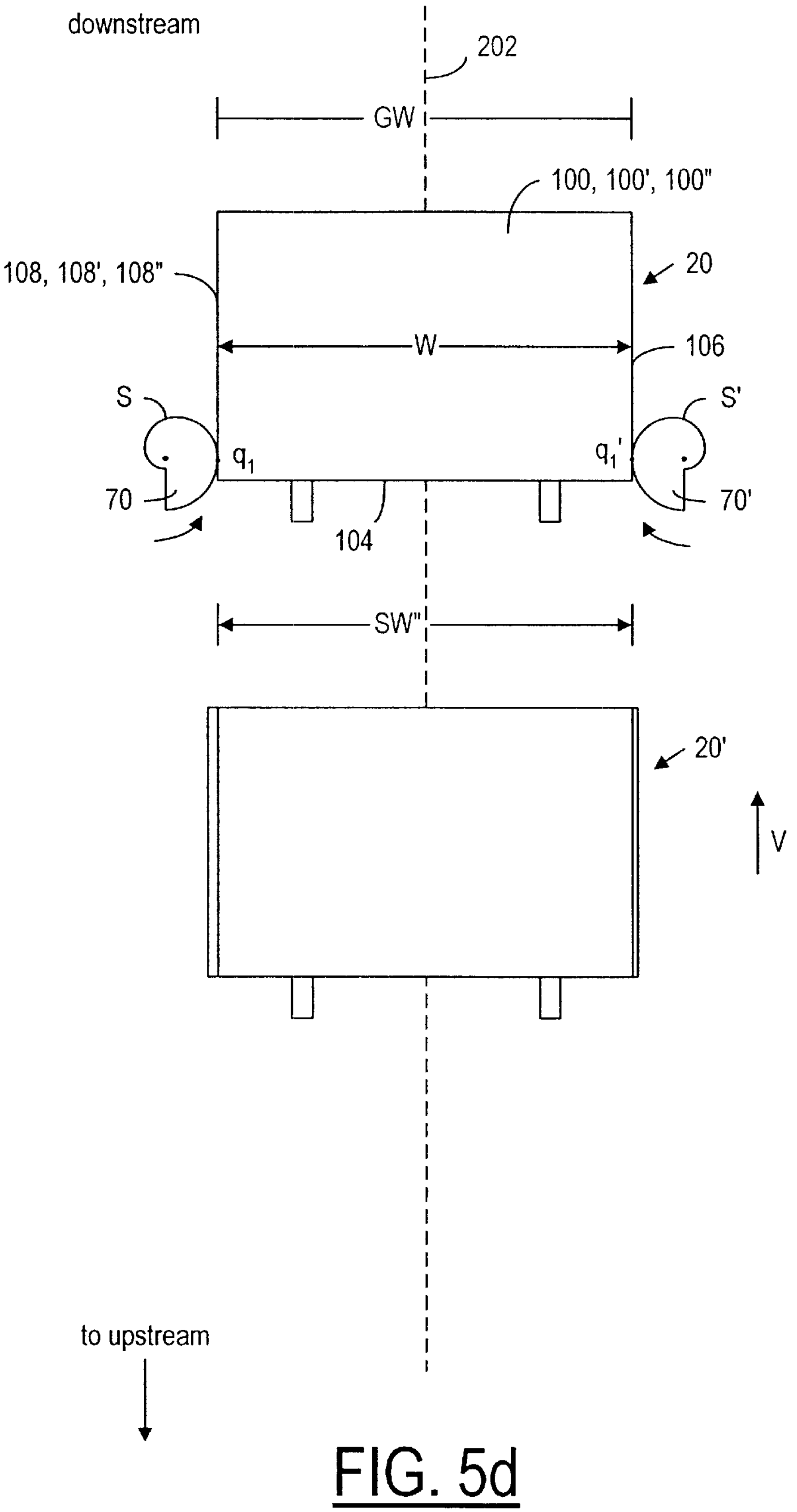
FIG. 5*d* is a diagrammatic representation illustrating the alignment system, according to the present invention, when the trailing edge of the stack has reached the aligning position of the alignment system.
Figure 5E:
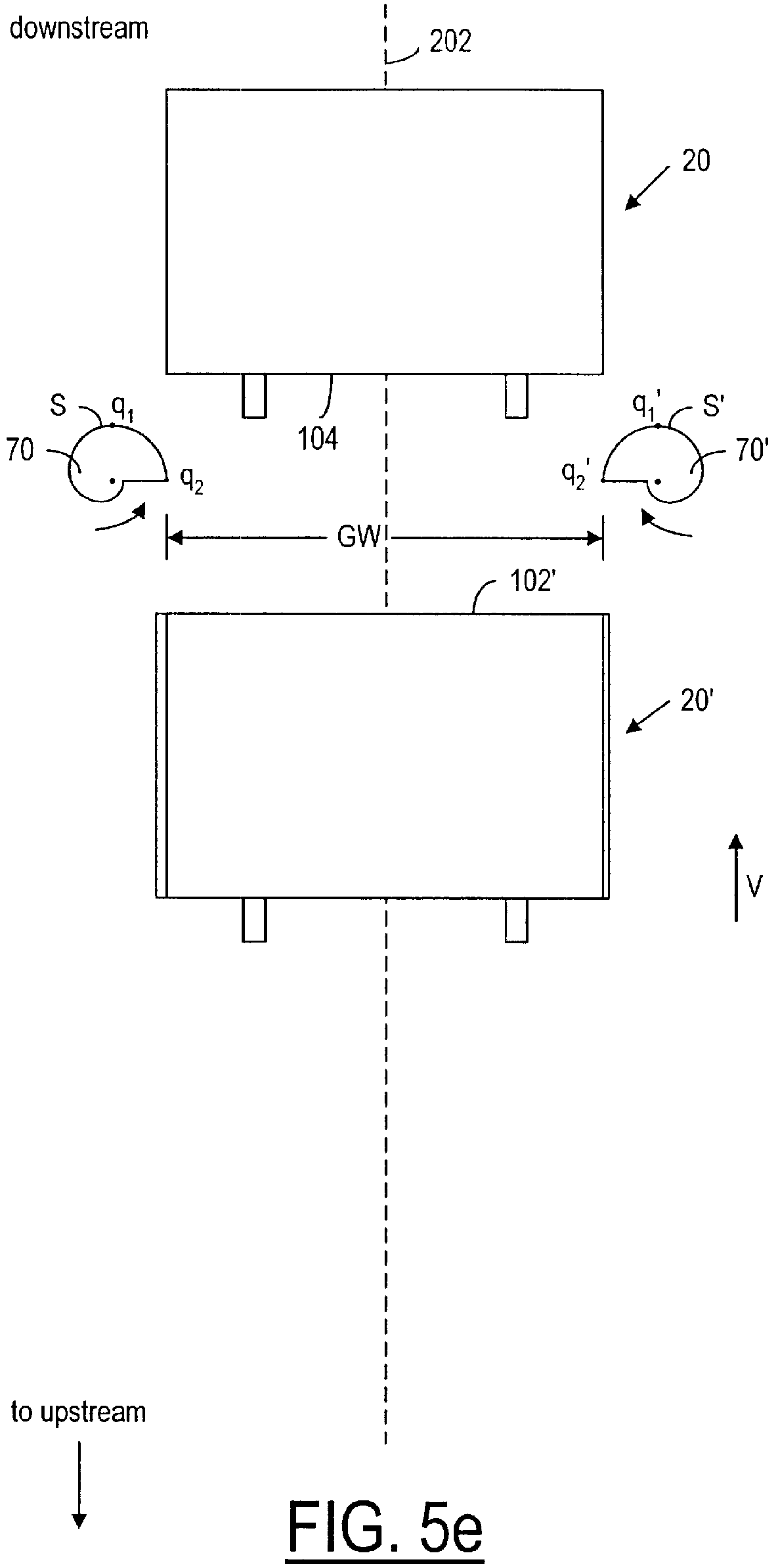
FIG. 5*e* is a diagrammatic representation illustrating the alignment system, according to the present invention, when the stack is completely off the alignment system and a following stack is approaching the aligning position.

As the cams rotate, the radius of the outer surface S and S' increases. According, the gate width GW is reduced. After the cams have rotated a quarter turn (from the positions as shown in FIG. 5*a*), the outer surface S of the cam 70 touches the left side-edge 108" of the bottom sheet 100", while the outer surface S' of the cam 70' touches the right side-edge 106 of the top sheet 100, as shown in FIG. 5*b*. As the cams rotate further and the gate width GW is reduced further, the outer surface S of the cam 70 pushes the left side-edge 108" of the bottom sheet 100" toward the center line 202, causing the bottom sheet 100" to move toward the right. At the same time, the outer surface S' of the cam 70' pushes the right side-edge 106 of the top sheet 100 toward the center line 202, causing the top sheet 100 to move to the left thereby reducing the stack width to SW', as shown in FIG. 5*c*. At some point during the passage of the stack 20 through the gate 52, the gate width GW, as defined by points q1 and q1' on the outer surfaces S and S' at this instant, becomes substantially equal to the width W of the sheets 100, 100' and 100". The side-edges of the sheets are caused by the outer surfaces S and S' to align with each other, as shown in FIG. 5*d*. The stack is thus aligned. After that alignment point, the radius of the outer surfaces S and S' can either remain the same or decrease, until the trailing edge 104 of the stack 20 has passed the gate 52. The cams 70 and 70', as shown in FIGS. 4–5*c*, are designed such that the radius of the outer surfaces S and S' remains the same after the alignment of the stack is completed. Accordingly, even after the stack 20 has moved further toward the downstream end, as shown in FIG. 5*e*, the gate width GW is the same as the gate width as shown in FIG. 5*d*. At this instant, the gate width GW is defined by points q2 and q2' on the outer surfaces S and S'. This means that the radius R, or the distance from the rotation axis of the cam 70 (70') to the outer surface S (S'), is the same from point q1 (q1') to point q2 (q2'), as shown in FIG. 7*a*. Accordingly, the tangential velocity of the outer surface S from point q1 to q2 is constant. Ideally, the tangential velocity of the outer surface S or S' from q1 or q1' to q2 or q2', respectively, is equal to V to avoid slippage. Thus, it is preferred that the radius R (from q1 to q2 and from q1' to q2') be equal to P/2π. In practice, if the contact between the cams and the side-edges of the sheets in the stack is brief, the tangential velocity of the outer surface S and S' at the alignment point can be smaller or greater than V. Accordingly, R can be smaller or greater than P/2π.

Figure 6A:
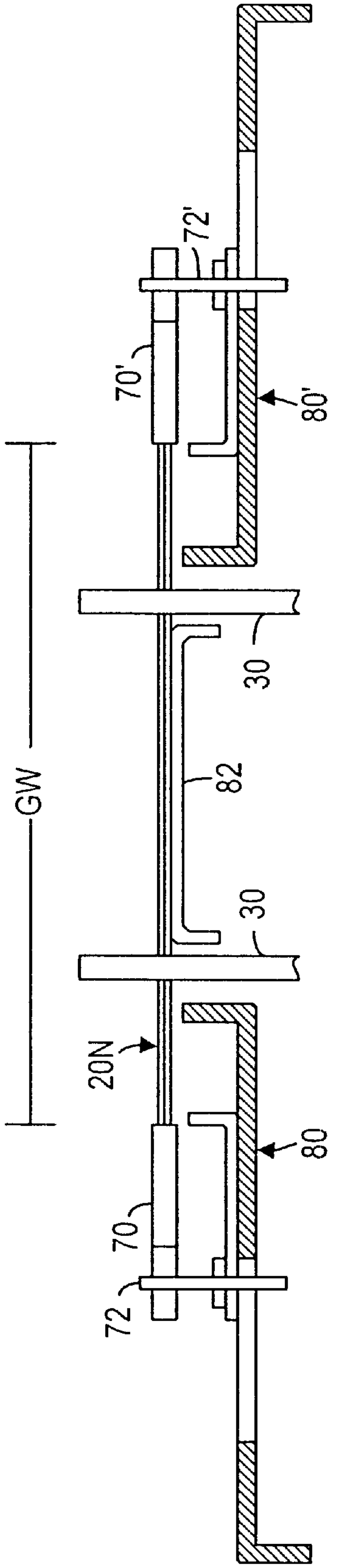
FIG. 6*a* is a diagrammatic representation illustrating the alignment system having an adjusting mechanism to accommodate the width of sheets.
Figure 6B:
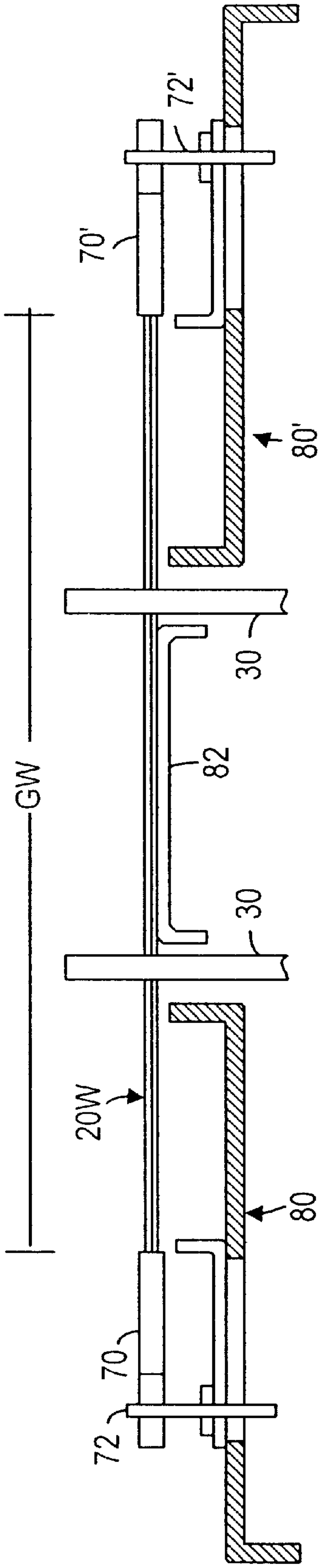
FIG. 6*b* is a diagrammatic representation illustrating the alignment system being used to aligned a stack of sheets with a greater width.

It is preferred that the gate width GW can be adjusted to accommodate sheets of different widths. As shown in FIGS. 6*a* and 6*b*, the rotation shafts 72, 72' are mounted to adjustment mechanisms 80, 80', respectively, so that they can be relocated to align a narrower stack 20N, or a wider stack 20W. The center portion of the stack is supported by a center deck as the stack is pushed by a pair of pusher fingers 30.

Figure 7B:
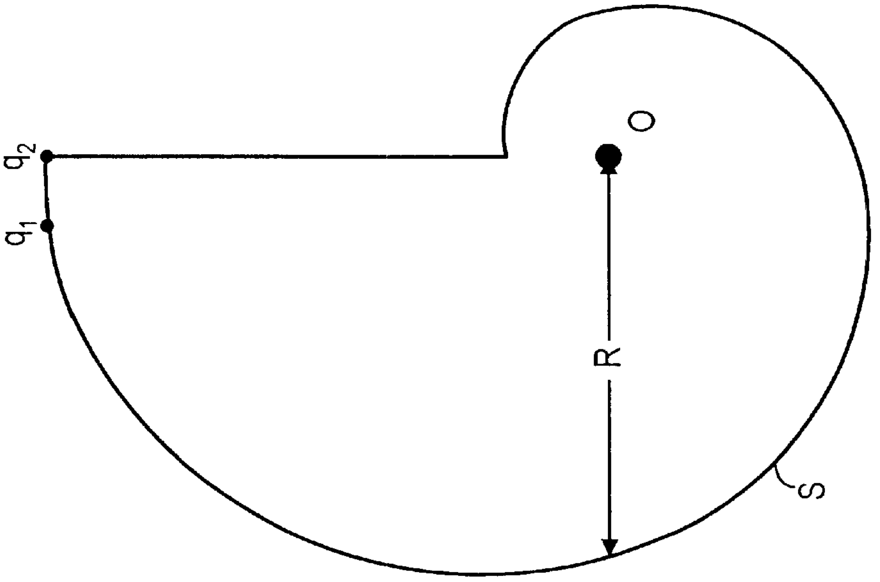
FIG. 7*b* is a diagrammatic representation illustrating a variation of the cam used in the alignment system, according to the present invention.
Figure 7A:
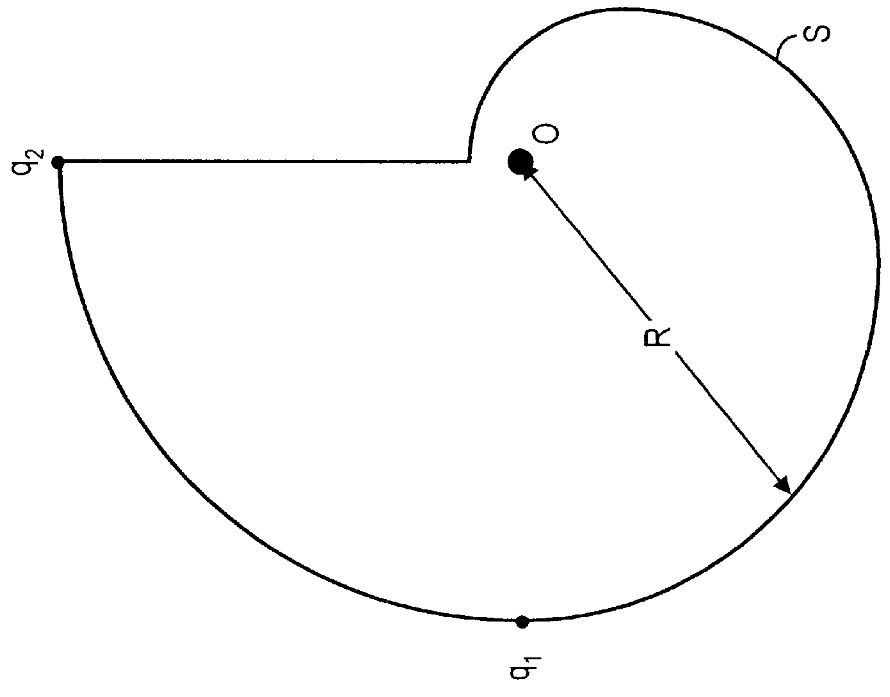
FIG. 7*a* is a diagrammatic representation illustrating the preferred embodiment of the cam used in the alignment system, according to the present invention.
Figure 7C:
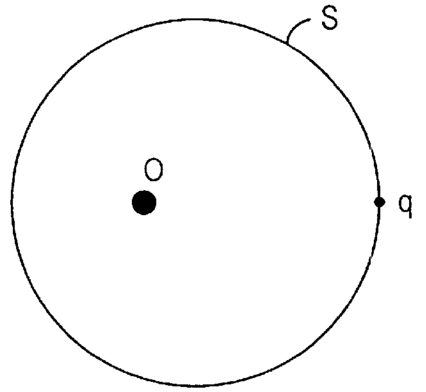
FIG. 7*c* is a diagrammatic representation illustrating another embodiment of the cam used in the alignment system, according to the present invention.
Figure 7D:
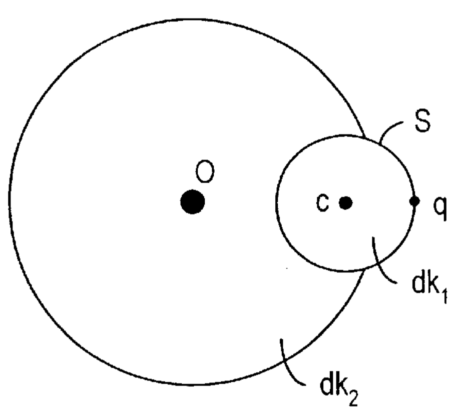
FIG. 7*d* is a diagrammatic representation illustrating yet another embodiment of the cam used in the alignment system, according to the present invention.
Figure 7E:
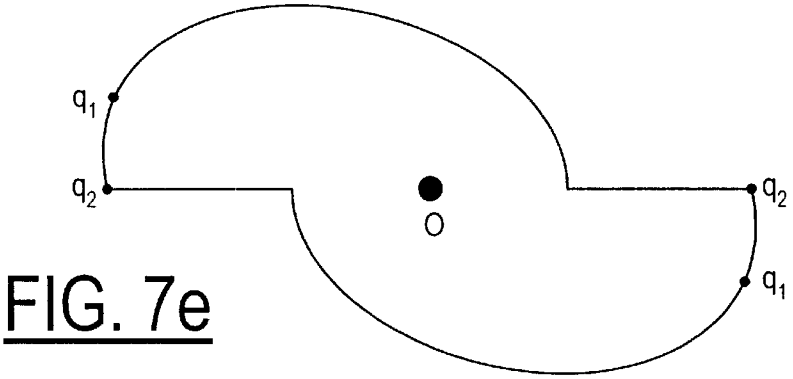
FIG. 7*e* is a diagrammatic representation illustrating still another embodiment of the cam used in the alignment system, according to the present invention.
Figure 7F:
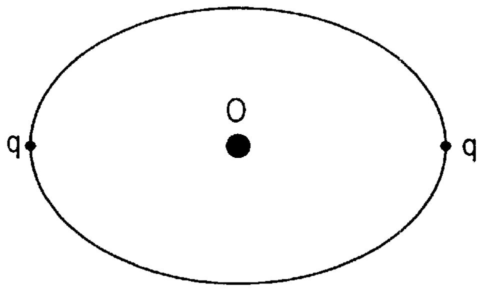
FIG. 7*f* is a diagrammatic representation illustrating a further embodiment of the cam used in the alignment system, according to the present invention.
Figure 7G:
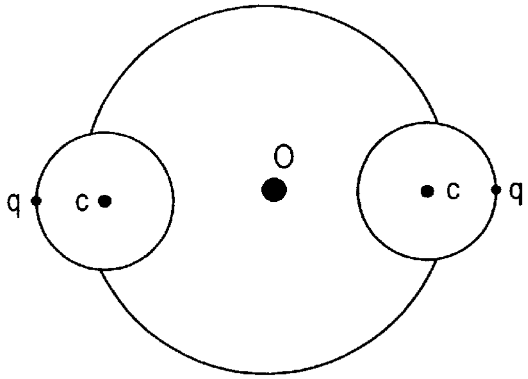
FIG. 7*g* is a diagrammatic representation illustrating yet another embodiment of the cam used in the alignment system, according to the present invention.

FIGS. 7*a*–7*g* shows examples of different cam designs. In FIG. 7*a*, a larger section of the outer surface S has a constant radius R, which is defined as the distance from the rotation axis O to a point on the outer surface S. As shown in FIG. 7*a*, from point q1 to point q2, the radius R is constant. In FIG. 7*b*, the surface section between point q1 and q2 is very smaller, as compared to the other section of the outer surface S. The cam, as shown in FIG. 7*a* and 7*b*, having a spiral shape. The cam as shown in FIG. 7*c* is a circular surface with an off-centered rotation axis O. In FIG. 7*d*, the cam is basically one circular disk (with center O') mounted on another circular disk (with rotation axis O). The cams as shown in FIGS. 7*a*–7*d* are designed to rotate 360 degrees in a time period t=P/V (see FIG. 4). The cams as shown in FIGS. 7*e* and 7*g* are designed to rotate 180 degrees in a time period t=P/V.

It should be noted that the present invention has been described in conjunction with a sheet collator, wherein a plurality of the sheets are collated into a stack, and a pair of alignment devices positioned on opposite sides of the stack to align the sheets in the stack. The present invention can also be used to align a single sheet, or an item with a substantially constant width, such as an envelope. In a sheet collator as shown in FIGS. 4–5*e*, the distance P between two adjacent stacks is constant and thus it is possible to link the cams to the endless chain to engage the cams in constant and continuous rotating motion. However, in a machine where the stacks are moving in a sporadic manner, it is possible that the cams are caused to rotate differently. For example, the cams can be caused to make a complete cycle to align a stack and pause to wait for the next stack. The cams can be triggered to start the next cycle by one or more sensors that detect the arrival of the next stack.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A sheet alignment system comprising:

a sheet collator, wherein a plurality of sheets, each having a leading edge and two opposing side edges defining a width, are moved along a path in a moving direction from an upstream end to a downstream end where the sheets are collated into a stack; and a pair of alignment devices located at opposite sides of a center line of the path near the downstream end for pushing the opposing side edges of the sheets toward the center line, wherein each alignment device comprises a cam having an outer surface with at least one non-constant radius surface section, and wherein the outer surfaces face each other to define a gate having a gate width; and means for causing the cams to rotate synchronously with respect to each other in opposite directions to change the gate width such that the gate width is greater than the width of the sheets when the leading edge moves into the gate, and the gate width is reduced after the leading edge has passed the gate until the gate width is substantially equal to the width of the sheets so as to cause the side edges of the sheets defining the stack to be aligned with each other.

2. The sheet alignment system of claim 1, wherein the cams are rotatably mounted on shafts further comprising means for relocating the shafts relative to each other to adjust the gate width in accordance with the width of the sheets.

3. The sheet alignment system of claim 1, wherein the outer surface of the cams is spiral in shape.

4. The sheet alignment system of claim 3, wherein the outer surface of the cams has a constant-radius surface section adjoining the non-constant radius surface section at a starting point, and wherein when the gate width is substantially equal to the width of the sheets, the outer surfaces face each other at the starting points.

5. The sheet alignment system of claim 4, wherein the sheets are moved at a constant sheet velocity and the cams are rotated at a constant angular velocity defining a tangential velocity at a point on the outer surface such that when the gate width is substantially equal to the width of the sheets, the tangential velocity of the outer surface of each cam is substantially equal to the sheet velocity.

6. The sheet alignment system of claim 1, wherein the outer surface of the cams is circular in shape, and each cam is rotated about an off-centered rotational axis.

7. The sheet alignment system of claim 6, wherein each of the cams has a largest radius and the outer surface of the cams has a surface point defining the largest radius as measured from the rotational axis, and wherein the sheets are moved at a constant sheet velocity and the cam is rotated at a constant angular velocity defining a tangential velocity of the outer surface such that when the gate width is substantially equal to the width of the sheets, the gate width is equal to the distance between the surface points of the cams and the tangential velocity is substantially equal to the sheet velocity.

8. The sheet alignment system of claim 1, wherein each of the cams comprises a first circular disk rotatably mounted on a second circular disk, and the cam is caused to be rotated about the center of the second circular disk, and wherein the outer surface of the cams is the circumference of the first circular disk.

9. The sheet alignment system of claim 1, wherein each of the cams comprises two first circular disks rotatably mounted on a second circular disk having a diameter and a center, and each cam is caused to rotate about the center of the second circular disk, and wherein the two first circular disks are mounted on the diameter of the second circular disk at opposite sides of the center of the second circular disk.

10. The sheet alignment system of claim 1, wherein the sheets are moved at a constant sheet velocity by a moving mechanism, and the cams are operatively linked to the moving mechanism for rotation in synchronism with the movement of the sheets.

11. A sheet alignment system for use in a sheet collator, wherein a plurality of sheets, each having a leading edge and two opposing side edges defining a width, are moved along a path in a moving direction from an upstream end to a downstream end where the sheets are collated into a stack, said sheet alignment system comprising:

a pair of alignment devices located at opposite sides of a center line of the path near the downstream end for pushing the opposing side edges of the sheets toward the center line, wherein each alignment device comprises a cam having an outer surface with at least one non-constant radius surface section, and wherein the outer surfaces face each other to define a gate having a gate width;

a means for causing the cams to rotate synchronously with respect to each other in opposite directions to change the gate width such that the gate width is greater than the width of the sheets when the leading edge moves into the gate;

the gate width is reduced after the leading edge has passed the gate until the gate width is substantially equal to the width of the sheets so as to cause the side edges of the sheets defining the stack to be aligned with each other; and wherein each of the cams is caused to rotate about a rotational axis, and the outer surface of each cam comprises two spiral surface sections symmetrically arranged about the rotational axis.

12. A sheet alignment system for use in a sheet collator, wherein a plurality of sheets, each having a leading edge and two opposing side edges defining a width, are moved along a path in a moving direction from an upstream end to a downstream end where the sheets are collated into a stack, said sheet alignment system comprising;

a pair of alignment devices located at opposite sides of a center line of the path near the downstream end for pushing the opposing side edges of the sheets toward the center line, wherein each alignment device comprises a cam having an outer surface with at least one non-constant radius surface section, and wherein the outer surfaces face each other to define a gate having a gate width;

a means for causing the cams to rotate synchronously with respect to each other in opposite directions to change the gate width such that the gate width is greater than the width of the sheets when the leading edge moves into the gate;

the gate width is reduced after the leading edge has passed the gate until the gate width is substantially equal to the width of the sheets so as to cause the side edges of the sheets defining the stack to be aligned with each other; and wherein the outer surface of the cams is elliptical in shape.

13. A method of alignment sheets in a sheet collator, wherein a plurality of sheets, each having a leading edge and two opposing side edges defining a width, are moved along a path in a moving direction from an upstream end to a downstream end where the sheets are collated into a stack; said method comprising the steps of:

providing a pair of alignment devices located at opposite sides of a center line of the path near the downstream end for pushing the opposing side edges of the sheets toward the center line, wherein each alignment device comprises a cam having an outer surface with at least one non-constant radius surface section, and wherein the outer surfaces face each other to define a gate having a gate width; and causing the cams to rotate synchronously with respect to each other in opposite directions to change the gate width such that the gate width is greater than the width of the sheets when the leading edge moves into the gate, and the gate width is reduced after the leading edge has passed the gate until the gate width is substantially equal to the width of the sheets so as to cause the side edges of the sheets defining the stack to be aligned with each other.

14. The method of claim 13, wherein the sheets are moved at a constant sheet velocity by an endless chain.

15. The method of claim 14, wherein the cams are rotated at a constant angular velocity and the alignment devices are operatively linked to the endless chain for rotation in synchronism with the movement of the sheets.

16. The method of claim 13, wherein the outer surface of the cams is spiral in shape.

17. The method of claim 16, wherein the outer surface of the cams has a constant-radius surface section adjoining the non-constant radius surface section at a starting point, and wherein when the gate width is substantially equal to the width of the sheets, the outer surfaces face each other at the starting points.

18. The method of claim 17, wherein the sheets are moved at a constant sheet velocity and the cams rotated at a constant angular velocity defining a tangential velocity at a point on the outer surface such that when the gate width is substantially equal to the width of the sheets, the tangential velocity of the outer surface of each cam is substantially equal to the sheet velocity.

19. The method of claim 18, wherein the sheets are moved by an endless chain and the cams are operatively linked to the endless chain for rotation in synchronism with the movement of the sheets.

* * * * *